Patented Oct. 19, 1937

2,095,961

UNITED STATES PATENT OFFICE 2,095,961

PROCESS OF REMOVING SOLVENTS FROM PLASTIC COLLOIDS

Harry P. Bassett, Cynthiana, Ky., assignor to Meigs, Bassett and Slaughter, Inc., Philadelphia, Pa., a corporation of Pennsylvania No Drawing. Application March 4, 1930, Serial No. 433,191

16 Claims. (Cl. 18—51)

This invention relates to a process of removing solvents from semi-solid or plastic colloids and in its specific embodiment relates particularly to the removal of solvents from cellulose nitrate plastic compositions such as celluloid.

The principal object of this invention is to provide a simple and efficient process of removing solvents from plastic colloids whereby a product of superior quality is obtained and the removal of solvents is accomplished in a relatively short period as compared with the time required in similar processes heretofore employed.

An important object of this invention is to provide a simple, rapid and efficient process of removing solvents from nitro-cotton or similar plastic compositions which is substantially free from the disadvantages commonly encountered in the processes heretofore employed for similar purposes.

A further object of this invention is to provide a process of preparing celluloid or other plastic sheets which are substantially free from integral dust specks and which are particularly adapted for use in making shatter-proof glass.

A further object of this invention is to provide a process of forming sheets or other articles of a cellulose nitrate or similar plastic composition by extrusion or like means directly from a mass of the plastic composition.

Other objects and advantages of the invention will become apparent during the course of the following description.

As is well known, in the preparation of plastic colloids such as celluloid, vulcanized fiber and the like, the basic materials employed are mixed with a suitable solvent, and generally a plasticizing agent, and the mass worked up into the desired condition after which it becomes necessary to remove substantially all of the solvent or solvents present in order to prepare a finished article from the material. In some cases the removal of the solvents is accomplished in several steps which prolong the operating time of the process and involves substantial expense. The present invention is designed to overcome to a large part these disadvantageous features of the processes heretofore employed.

Other disadvantageous features are also encountered in the preparation of cellulose nitrate plastic compositions. As is well known, celluloid and other nitro-cotton plastics are ordinarily prepared by suitably working up collodion, a plasticizing agent such as camphor, and a solvent such as alcohol, acetone, a mixture of ether and alcohol, or the like, driving off the excess of solvent, forming the article into a block or a mass of a particular shape and "ageing" the finished article, i. e., removing the remaining solvent. In the formation of sheets of the plastic compositions, such as celluloid sheets, the block of material is sliced or cut into sheets of the desired size and thickness, after which the sheets are "aged".

In the "ageing" of nitro-cotton plastic compositions, and particularly celluloid sheets, the products are generally exposed to a drying atmosphere for a relatively long period of time. For example, in "ageing" celluloid sheets it is often the practice to suspend the sheets in a drying chamber for as long as from one to three weeks. This air drying process, although widely practiced, is attended with numerous disadvantages, particularly in the case of celluloid sheets which are to be used in the making of "shatter-proof glass". For example, the ageing plastics collect a greater or less amount of atmospheric dust and this extraneous matter becomes an integral part of the product during the drying process. Moreover, the plastic products tend to become case-hardened rather than of homogeneous texture. Also, thin products such as celluloid sheets tend to curl and twist up during the ageing treatment whereby further treatment is required before the sheets are suitable for use. These disadvantages, taken with the important disadvantages of the excessive time required for ageing and the necessity of a specially constructed drying room, have created a demand for a rapid and simple process of ageing nitro-cotton or other plastics which is free from these disadvantages.

The foregoing disadvantages have also created a demand for a process of preparing finished articles by extrusion or like means directly from the basic mass of prepared plastic material whereby the intermediate steps between the mixing of the ingredients and the final formation of the product are eliminated.

I have discovered a simple process for removing solvents from partially finished plastic colloids such as vulcanized fiber, celluloid, and the like, which process may also be utilized to prepare finished plastic colloid products directly from the original mass of the plastic material employed. While, as suggested, the process is applicable for use for removing solvents such as zinc chloride from plastic compositions such as vulcanized fiber, the invention is particularly adapted for application in the removal of solvents from cellulose nitrate plastic compositions, particularly celluloid. The process is based on my discovery that solvents may be removed from plastic colloids without harm to the quality or color of the final product by immersing the material from which the solvents are to be removed in a nonsolvent bath which has an osmotic pressure at least as great as that within the colloid and gradually reducing the osmotic pressure of the treating bath, preferably by the addition thereto of a miscible non-solvent of the plastic composition which is capable of materially reducing the osmotic pressure of the bath. It has been found that plastic colloids such as a celluloid mix may be extruded into a treating bath of this character and a finished product obtained by reducing the osmotic pressure of the bath whereby celluloid products, such as sheets, of superior quality can be formed in a relatively short period of time.

Various treating baths may be employed to secure an osmotic pressure which is at least as great as or greater than the osmotic pressure within the colloid to be treated. For example, a concentrated aqueous solution of common salt or sugar may be employed. However, I prefer to employ a solution of the desired osmotic pressure of the solvent or one of the ingredients of the solvent present in the plastic colloid and in the specific embodiment wherein celluloid or like nitro-cotton plastic colloids are being treated I prefer to employ a solution of alcohol. The osmotic pressure of this treating bath may be reduced by replacing the solution with any miscible non-solvent of the colloid which is capable of reducing the osmotic pressure of the bath. However, in the interest of economy, I prefer to employ water to reduce the osmotic pressure of the bath.

In an attempt to remove the remaining solvents from partially finished nitro-cotton or other plastics in a rapid and efficient manner, the expedient of immersing the products to be treated in water was practiced, it being recognized that the solvents, ordinarily used are readily soluble in or miscible with and have a certain affinity for water. However, this expedient was not successful for the reason that, although the solvent was removed, the composition became substantially opaque due to a discoloration which is commonly termed "blushing". This proved to be particularly disadvantageous in connection with the preparation of celluloid sheets designed for use in the manufacture of "shatter-proof glass", in which type of glass a sheet of celluloid is placed between and united to two pieces of glass. However, the solvent was satisfactorily removed by the water treatment and this method was pursued with a view of overcoming the "blushing" effect produced.

After repeated experiments, it was found that the solvent or solvents could be satisfactorily removed and the "blushing" avoided by immersing the partially finished article for a suitable length of time in a bath of water containing a suitable material in a sufficient amount to raise the osmotic pressure of the bath to that of or greater than the osmotic pressure within the plastic material, and gradually replacing the added material in the treating bath with water or other miscible nonsolvent of the plastic composition adapted to reduce the osmotic pressure materially below that within the colloid. In the case of celluloid, it was found advantageous to add a substantial proportion, say from 20 to 40 per cent. of alcohol to the treating bath and gradually replace this with water.

Following this procedure, celluloid sheets $\frac{1}{20}$ of an inch thick were found to be completely "aged" in five hours without any "blushing" of the sheets. Moreover, this ageing process resulted in the formation of products of substantially homogeneous texture which were wholly free from dust and substantially free from the curling and twisting characteristic of the air-aged products as described above. Accordingly, this improved procedure has been utilized with great practical success particularly in the manufacture of celluloid sheets designed to be used in making "shatter-proof glass".

In addition to providing an efficient means of "ageing" plastic colloids the process has been found to be of great practical value in forming finished products from plastic colloids as originally mixed for use. In this modification of the invention, the mixed material, such as a plastic celluloid mix was extruded in sheet form into the treating bath of the desired osmotic pressure and the bath gradually replaced with water. The sheets produced were of superior quality and their production was obtained in a very small fraction of time which is now required for the production of similar articles according to the methods commonly employed. Moreover, this modification of the process effects a material economy since the intermediate steps of forming a partially prepared product are eliminated.

For the purpose of describing the preferred practice of my process the procedure of ageing partially prepared celluloid sheets will be outlined. However, this procedure should be considered as illustrative only since it is to be understood that the same general procedure may be followed in connection with other partially prepared plastic colloids, such as those referred to above, and may also be followed where a mix of the plastic colloid material is directly formed into a finished product as by means of extrusion.

In the manufacture of celluloid sheets, the compressed block of freshly prepared celluloid which has been formed in the usual manner is sliced or cut according to any conventional process into sheets of the desired size and thickness. These sheets will contain a certain amount of residual solvent such as ether and alcohol, or the like, and for the purpose of removing such residual solvent the freshly prepared sheets are immersed in a suitable tank containing an aqueous solution of alcohol, or other nonsolvent solution, having an osmotic pressure slightly greater than the osmotic pressure within the celluloid. When alcohol in water is employed, I have found it advantageous to employ a solution containing approximately 20 per cent. of the alcohol. This percentage may be widely increased or decreased according to the osmotic pressure within the celluloid but the use of a greater amount of alcohol is generally not recommended for the reason that no substantially improved results are obtained and the process is rendered more expensive by this use of an excessive amount of alcohol. In the preferred practice, the celluloid sheets are suspended in any suitable manner from supporting frames in a 20 per cent. aqueous solution of alcohol and this solution is gradually replaced by water, the replacement requiring about five hours in the case of sheets $\frac{1}{20}$ of an inch thick. A temperature corresponding to normal atmospheric temperature has been found to be most satisfactory for commercial use but temperatures as high as 40 to 50° C., and even higher, may be used commercially with good results, but the lower the temperature, the less loss of alcohol and formation of defects, such as bubbles, haze and the like.

During the ageing process, as described, the residual solvent in the freshly prepared material is taken up by the water with the result that, after the relatively short period of treatment set forth above, substantially all of the solvent is removed and a finished product of substantially homogeneous texture is produced. The surface liquid need only be removed before the product is in condition for use as desired.

A modification of this process which is particularly advantageous for use on a large commercial scale and which is productive of exceptionally good results consists in the employment of a plurality of tanks, say six in number, in which the percentage of alcohol is progressively decreased. For example, the first tank may contain a solution containing approximately 20 per cent. alcohol into which the celluloid or other plastic is placed. This solution is replaced gradually by water and allowed to overflow into tank #2, which contains a previous charge of celluloid, tank #2 overflowing into tank #3 and so forth to tank #6. By this time, the plastic in tank #1 is aged sufficiently and is removed and a fresh charge placed therein. Tank #2 then receives the water and in a short time, say one hour, more is aged and plastic is removed, #1 becoming #6 and #2 becoming #1, and so forth in a countercurrent manner.

The above method is most practical but the countercurrent principle may be also used by employing a series of tanks in which the percentage of alcohol progressively decreases and moving the plastic from time to time at stated intervals. According to this modification, the freshly formed sheets are dipped into the treating tank containing the largest percentage of alcohol where they are left for the desired period of time after which they are removed to the intermediate treating tanks where they are immersed for corresponding periods after which they are introduced into the final treating tank. As will be apparent, the time of treatment in the various tanks may be widely varied according to the nature of the particular articles under treatment and the amount of residual solvent present therein.

Another form of continuous process may be provided by the use of an elongated tank into the entry end of which is caused to flow a current of alcohol and into the discharge end of which is caused to flow a current of water so that the strength of the alcohol progressively decreases toward the discharge end of the tank. In this modification the sheets may be moved by suitable mechanism from the inlet to the discharge end of the apparatus.

In the modification of the process wherein a plastic composition, such as celluloid, is to be extruded or otherwise formed directly into sheets or other masses of a particular shape, any conventional extruding or like machine may be employed and the extruded mass is introduced into the treating bath where it is preferably given a similar treatment to that described above. When the residual solvent has been removed during the process the sheets or other articles are removed and freed from surface liquid after which they may be used directly or subjected to any finishing steps as may be desired.

While I have described in detail the preferred embodiments of my invention, it is to be understood that the details of procedure may be variously modified without departing from the spirit of the invention or the scope of the subjoined claims.

I claim:

1. The process of removing residual solvent, without substantial removal of plasticizing agent, from a coagulated cellulose ester thermoplastic composition which contains a plasticizing agent and from which the excess of solvent has been removed, which comprises immersing such thermoplastic composition in a bath comprising an aqueous solution of alcohol having an osmotic pressure at least as great as that within the thermoplastic composition, the amount of alcohol in said bath being insufficient substantially to remove the plasticizing agent from said thermoplastic composition, and, while said thermoplastic composition is immersed, gradually decreasing the alcohol content with water to reduce the osmotic pressure of the bath below that within the thermoplastic composition.

2. The process of removing residual solvent, without substantial removal of plasticizing agent, from a coagulated cellulose nitrate thermoplastic composition which contains camphor as a plasticizing agent and from which the excess of solvent has been removed, which comprises immersing said thermoplastic composition in a bath comprising an aqueous solution of alcohol having an osmotic pressure at least as great as the osmotic pressure within the thermoplastic composition, the amount of alcohol in said bath being insufficient substantially to remove the camphor from said thermoplastic composition, and, while said thermoplastic composition is immersed, gradually reducing the osmotic pressure of the bath below that within the thermoplastic composition.

3. The process of removing residual solvent, without substantial removal of plasticizing agent, from a freshly formed cellulose nitrate thermoplastic composition which contains camphor as a plasticizing agent and from which the excess of solvent has been removed, which comprises immersing such thermoplastic composition in a bath comprising an aqueous solution of alcohol having an osmotic pressure at least as great as that within the thermoplastic composition, the amount of alcohol in said bath being insufficient substantially to remove the camphor from said thermoplastic composition, and, while said thermoplastic composition is immersed, gradually decreasing the alcohol content with water to reduce the osmotic pressure of the bath below that within the thermoplastic composition.

4. The process of solidifying a non-solid thermoplostic cellulose nitrate composition containing alcohol as a solvent and camphor as a plasticizing agent, without substantial removal of said camphor, which comprises extruding such thermoplastic composition into a bath comprising an aqueous solution of alcohol having an osmotic pressure at least as great as that within said thermoplastic composition, the amount of said alcohol in said bath being insufficient substantially to remove the camphor from said thermoplastic composition, and gradually reducing the osmotic pressure of the bath below that within said thermoplastic composition.

5. The process of solidifying a non-solid thermoplastic cellulose nitrate composition containing alcohol as a solvent and camphor as a plasticizing agent, without substantial removal of said camphor, which comprises extruding such thermoplastic composition into a bath containing water and alcohol having an osmotic pressure at least as great as that within said thermoplastic composition, the amount of alcohol in said bath being insufficient substantially to remove the camphor from said thermoplastic composition, and gradually reducing the alcohol content of said bath with water to reduce the osmotic pressure below that within said thermoplastic composition.

6. The process of solidifying a non-solid thermoplastic cellulose nitrate composition containing alcohol as a solvent and camphor as a plasticizing agent, which comprises extruding such thermoplastic composition into a bath containing water and alcohol, the amount of said alcohol in said bath being insufficient substantially to remove the camphor from said thermoplastic composition and not exceeding 40 per cent. by volume, and gradually reducing the alcohol content of said bath with water.

7. The process of removing residual solvent from a freshly formed cellulose nitrate thermoplastic composition which contains a plasticizing agent and from which the excess of solvent has been removed, which comprises immersing such product in an aqueous solution of alcohol, the amount of said alcohol present being insufficient substantially to remove the plasticizing agent from said thermoplastic composition, and, while said product is immersed, gradually decreasing the percentage of alcohol present.

8. The process of removing residual solvent from a freshly formed cellulose nitrate thermoplastic composition which contains a plasticizing agent and from which the excess of solvent has been removed, which comprises immersing such product in an aqueous solution of alcohol, the amount of said alcohol present being insufficient substantially to remove the plasticizing agent from said thermoplastic composition, and, while said product is immersed, gradually decreasing the alcohol content with water.

9. The process of removing residual solvent from freshly formed celluloid which comprises immersing the celluloid in a bath comprising an aqueous solution of alcohol, the amount of said alcohol in said bath being insufficient substantially to remove the camphor from said celluloid, and, while said celluloid is immersed, gradually reducing the alcohol content with water.

10. The process of removing residual solvent from a freshly formed cellulose nitrate thermoplastic composition from which the excess of solvent has been removed which comprises immersing such product in water containing approximately from 20 to 40 per cent. by volume of a constituent of the solvent of such thermoplastic composition, and, while said product is immersed, gradually decreasing the percentage of said solvent constituent present.

11. The process of removing residual solvent from a freshly formed plasticizing-agent-containing cellulose nitrate thermoplastic composition from which the excess of solvent has been removed, without substantial removal of said plasticizing agent, which comprises immersing such product in water containing approximately from 20 to 40 per cent. by volume of alcohol, and, while said product is immersed, gradually reducing the alcohol content with water.

12. The herein described process of removing residual solvent from freshly formed celluloid which comprises immersing the celluloid in water containing from 20 to 40 per cent. by volume of alcohol while maintaining such solution at a temperature below boiling, and, while said celluloid is immersed, gradually reducing the alcohol content with water.

13. The process of removing residual solvent from freshly formed celluloid sheets, without substantial removal of the camphor therefrom, which comprises maintaining such sheets immersed in a bath comprising water and from 20 to 40 per cent. by volume of alcohol to effect removal of said solvent.

14. The process of removing residual solvents from freshly formed celluloid sheets, without substantial removal of the camphor therefrom, which comprises subjecting such sheets to the action of progressively decreasing strengths of alcohol in water solution, the initial solution containing approximately from 20 to 40 per cent. alcohol by volume.

15. In the production of a substantially solvent-free thermoplastic cellulose ester product containing a plasticizing agent from a cellulose ester thermoplastic composition containing solvent and a plasticizing agent, without substantial removal of said plasticizing agent, the improvement which comprises introducing such thermoplastic composition into a bath comprising an aqueous solution of alcohol having an osmotic pressure at least as great as that within the thermoplastic composition, the amount of alcohol in said bath being insufficient substantially to remove the plasticizing agent from said thermoplastic composition, and, while said thermoplastic composition is immersed, gradually decreasing the alcohol content with water to reduce the osmotic pressure of the bath below that within the thermoplastic composition.

16. In the production of a substantially solvent-free thermoplastic cellulose nitrate product containing camphor as a plasticizing agent from a cellulose nitrate thermoplastic composition containing solvent comprising alcohol and a plasticizing agent comprising camphor, without substantial removal of said camphor, the improvement which comprises introducing such thermoplastic composition into a bath comprising water and from 20 to 40 per cent. by volume of alcohol, and, while said product is immersed, gradually decreasing the alcohol content with water.

HARRY P. BASSETT.